(12) United States Patent
Clark et al.

(10) Patent No.: US 8,673,203 B2
(45) Date of Patent: Mar. 18, 2014

(54) METHOD OF DEPOSITING MATERIAL

(75) Inventors: Daniel Clark, Belper (GB);
Christopher A. Simmons,
Burton-on-Trent (GB); **Mark D.
Hancock**, Derby (GB)

(73) Assignee: Rolls-Royce PLC, London (GB)

( * ) Notice: Subject to any disclaimer, the term of this patent is extended or adjusted under 35 U.S.C. 154(b) by 351 days.

(21) Appl. No.: 12/861,386

(22) Filed: Aug. 23, 2010

(65) Prior Publication Data

US 2011/0057360 A1    Mar. 10, 2011

(30) Foreign Application Priority Data

Sep. 4, 2009 (GB) .................................. 0915401.4

(51) Int. Cl.
*B29C 35/08* (2006.01)

(52) U.S. Cl.
USPC ........................................................ 264/497

(58) Field of Classification Search
USPC ........................................................ 264/497
See application file for complete search history.

(56) References Cited

U.S. PATENT DOCUMENTS

| 4,654,501 A | 3/1987 | Piatt |
| 5,372,861 A | 12/1994 | Kerrand et al. |
| 2006/0003095 A1 | 1/2006 | Bullen et al. |

FOREIGN PATENT DOCUMENTS

| EP | 0 511 746 A2 | 11/1992 |
| EP | 0 562 920 A1 | 9/1993 |
| EP | 1 637 274 A1 | 3/2006 |
| JP | A-62-24883 | 2/1987 |
| KR | 10-2006-0131417 B1 | 4/2008 |

OTHER PUBLICATIONS

British Search Report dated Sep. 28, 2009 issued in corresponding British Patent Application No. 0915401.4.
European Search Report dated Dec. 29, 2010 in corresponding European Application No. 10173688.2.

*Primary Examiner* — Larry Thrower
(74) *Attorney, Agent, or Firm* — Oliff, PLC

(57) ABSTRACT

A method for depositing material at an intersection region (116) of at least two surfaces (102,104,106,108,110) of a component (100). The method comprises a first deposition process providing material at said intersection and directing an energy beam (114) toward the intersection region to join the material to the component. The beam is maintained at an obtuse angle relative to at least two of the surfaces such that substantially all of the working area of the beam is incident upon the intersection region.

15 Claims, 5 Drawing Sheets

METHOD OF DEPOSITING MATERIAL

FIELD OF INVENTION

The present invention relates to a method of depositing material on a substrate.

BACKGROUND OF THE INVENTION

It is known to use Laser Weld Deposition techniques to build structures on a substrate. In some circumstances deposition is required along the edge of a component, such as a rotor blade from turbo machinery in order to repair damage or wear to the tip or edge of the blade. Commonly the blade is ground back to remove the damaged area and laser weld deposition is used to join material to the blade to build a structure which can be machined to form a required blade geometry. FIG. 1 shows a component 10 with material 12 being deposited on its tip 14 by a laser weld deposition technique. Powder 16 of a suitable material is directed towards the tip 14 from a nozzle 18, and enters the path of a laser beam centroid and perimeter 20 from a laser 22 which briefly brings it and the surface of the tip 14 to a molten state before solidifying and raising the overall height of the component 10. The laser 22 is moved backward and forward across the tip 14 to build the required structure, with the beam 20 being maintained substantially perpendicular to the surface of the tip 14 to ensure the energy density is evenly distributed where the beam 20 is incident upon the tip 14. In FIG. 1 the laser beam 20 is presented as single line, but in reality will have width and converge to a point to form a working area. Unless the position of the beam 20 is controlled very precisely, when the laser 18 reaches the edge 24 of the tip 14, a proportion of the beam energy may extend down a side 26 of the component 10, possibly heating the surface of the side 26 and changing the structure of the surface and/or causing stray powder 28 to become adhered to the side 26 of the blade 10. Extra machining operations may be required to repair damage caused or remove erroneously deposited material powder 28, which increases the overall component 10 manufacture time and cost.

Hence a method of depositing material at the edge of a substrate which reduces the likelihood of rework to the side of the substrate is highly desirable.

SUMMARY OF THE INVENTION

Accordingly there is provided a method for depositing material at an intersection region of at least two surfaces of a component, the method comprising a first deposition process providing material at said intersection and directing an energy beam toward the intersection region to join the material to the component, wherein the beam is maintained at an obtuse angle relative to at least two of the surfaces such that substantially all of the working area of the beam is incident upon the intersection region.

The advantage of this method is that when material is being deposited at the intersection of surfaces of a component, all of the working area of the energy beam is incident upon the intersection, and thus is not erroneously misdirected towards any other surface where it might cause damage or the deposition of weld material.

BRIEF DESCRIPTION OF THE DRAWINGS

Embodiments of the invention will now be described with reference to the accompanying drawings, in which.

DETAILED DESCRIPTION OF EMBODIMENTS

Figure 1:
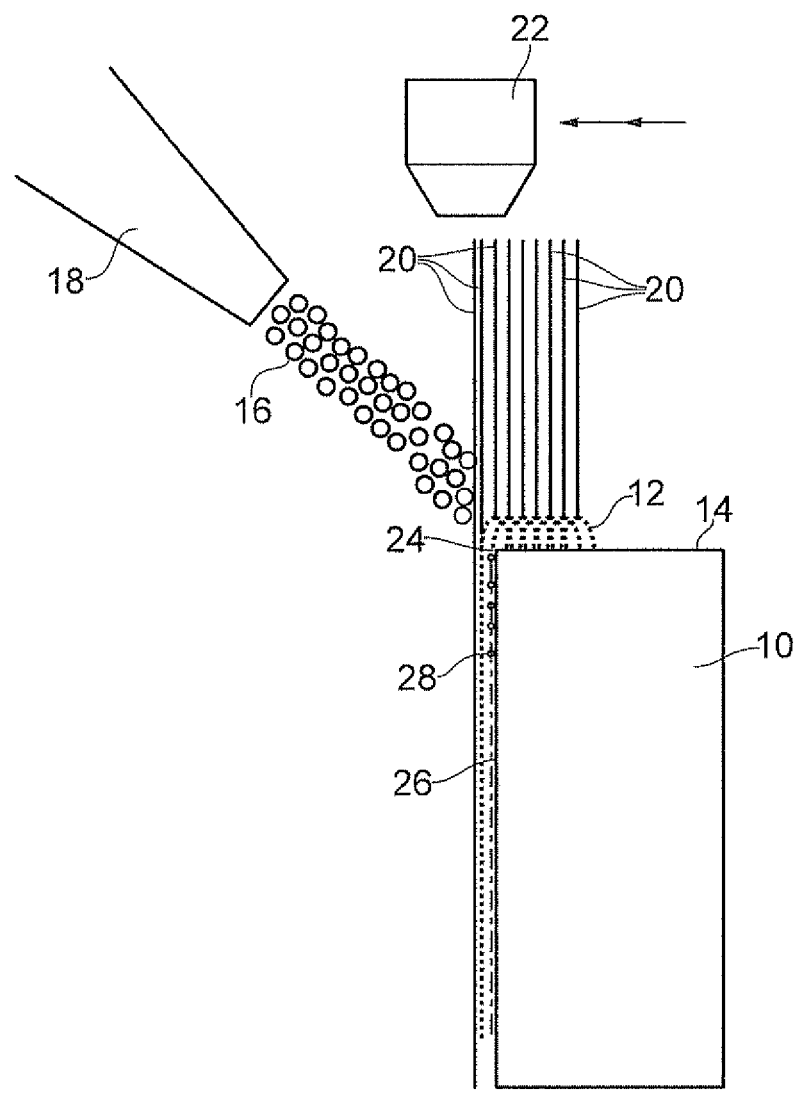
FIG. 1 (PRIOR ART) shows a known configuration for building a structure on a component using laser weld deposition.
Figures 2, 3:
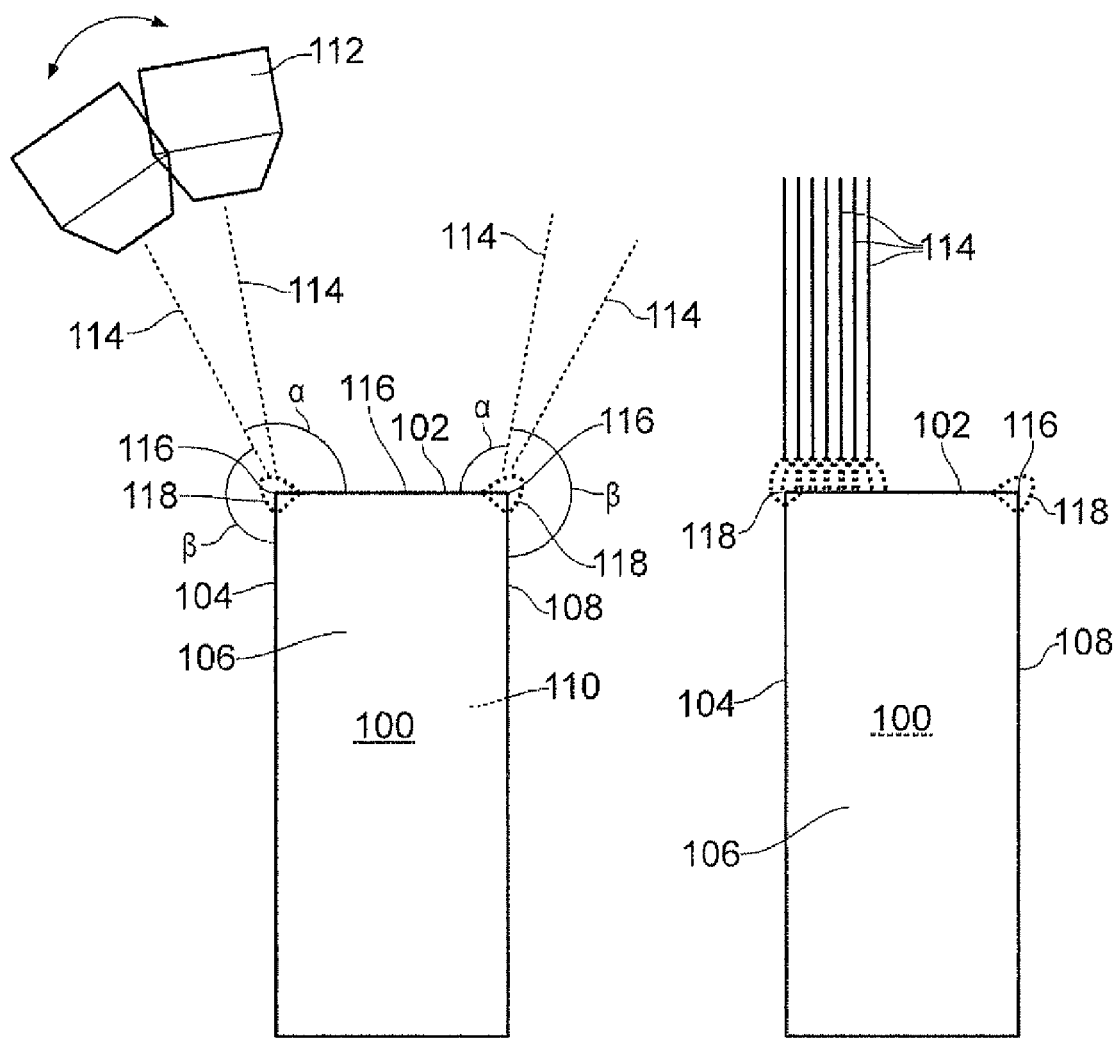
FIG. 2 shows a configuration according to the present invention for building edges of a structure on a component using laser weld deposition.
FIG. 3 shows a configuration to build a structure behind the edges of the structure shown in FIG. 2.

Shown in FIG. 2 is a cross sectional view of a substrate 100 having a tip surface 102 and first, second, third and fourth side surfaces 104, 106, 108, 110, where surface 110 is hidden from view. A source of beamed energy, such as a laser 112 is provided adjacent the substrate and generates a beam 114, and a source of powdered material (not shown, but as described with respect to the prior art in FIG. 1) is directed towards the focal point of the laser where it meets the substrate. For example, the welding apparatus may be a laser weld apparatus, having a laser as a source of directed energy and powdered weld material delivery system.

In the method of the present invention, during a first deposition process a material deposited at the edge of the tip of the substrate. The edge is defined by the intersection region 116 of surfaces 102, 104, surfaces 102 and 106, surfaces 102 and 108, and surface 102 and 110. The edge 116 may be straight or curved in one or more planes. That is to say, surface 102 may be flat and surface 104 is curved, so that the intersection 116 is curved in one plane. Alternatively, surface 102 and 104 may both be curved, so that the intersection 116 is curved in two or more planes. The first deposition process forms a wall 118 around the circumference of the tip surface 102 at the intersection region 116. In an alternative example, the material may be deposited along only part of the intersection 116, or only at one position at an intersection 116. The process of directing a powdered material towards a substrate, bringing the powdered material and the surface of the substrate into a molten state with a beam of energy, such as a laser beam 114 to join the material to the substrate is well known in the art. However, the method according to the present invention includes the step of maintaining the energy beam 114 at an obtuse angle relative to at least two of the surfaces 104, 106, 108, 110 such that substantially all of the working area of the beam 114 is incident upon the intersection region 116. In order for a wall 118 to be built up, the component 100 and energy beam 114 are moved relative to one another. The beam 114 may be moved and the component 100 is kept static, or the component 100 is moved and the beam 114 is held static. Alternatively the beam 114 and the component 100 may both be moved. Successive layers of material may be joined with the component 100 to build the wall 118 to the required height.

Figure 4:
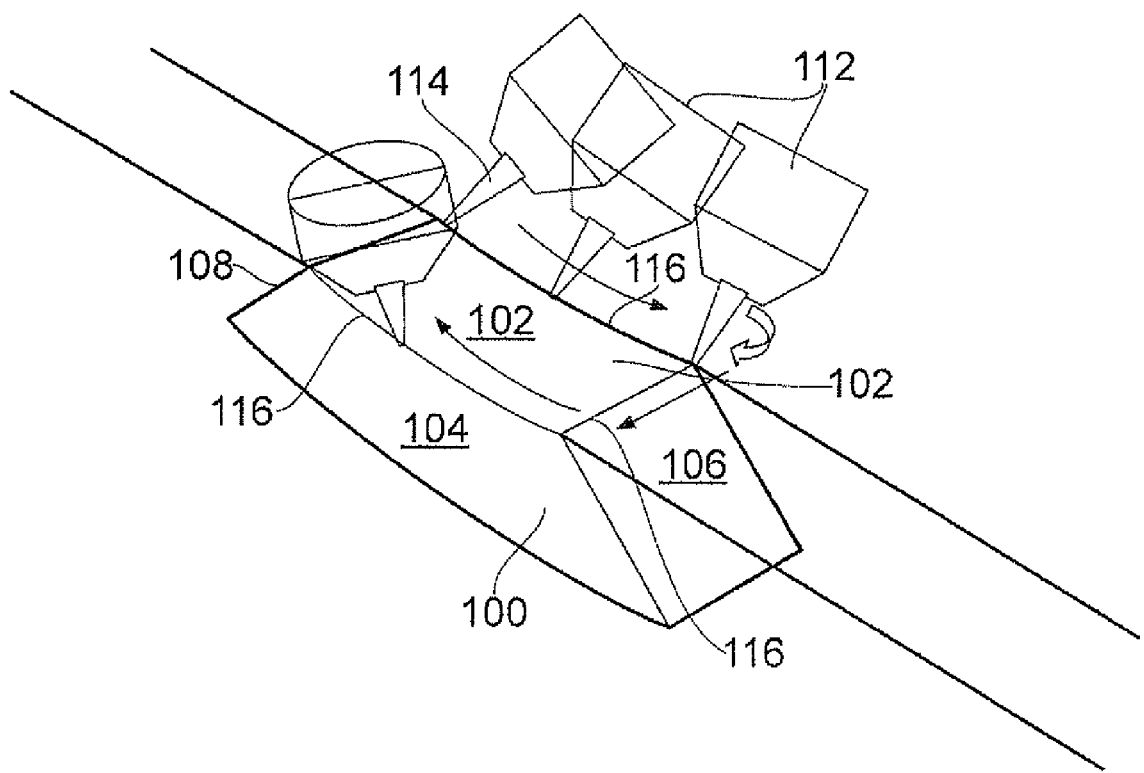
FIG. 4 shows a perspective view of the path of a laser around the edge of a component when performing the operation of FIG. 2.

For the example shown to the left of FIG. 2, where the wall 118 is being deposited at the intersection 116 between the tip surface 102 and the side surface 104, an obtuse angle α maintained between the laser 114 and the tip surface 102 and, for the same example, an obtuse angle β is maintained between the laser 114 and the side surface 104. Referring now to FIG. 4, the angles α, β are maintained with respect to the surfaces 102,104, at the point where the laser 144 coincides with the intersection 116, as the laser is moved around the intersection region 116. When the laser beam 114 reaches a corner intersection (e.g. where surfaces 102, 104 and 106 meet) an obtuse angle is maintained between the beam 114 and all three surfaces of the intersection.

Figure 5:
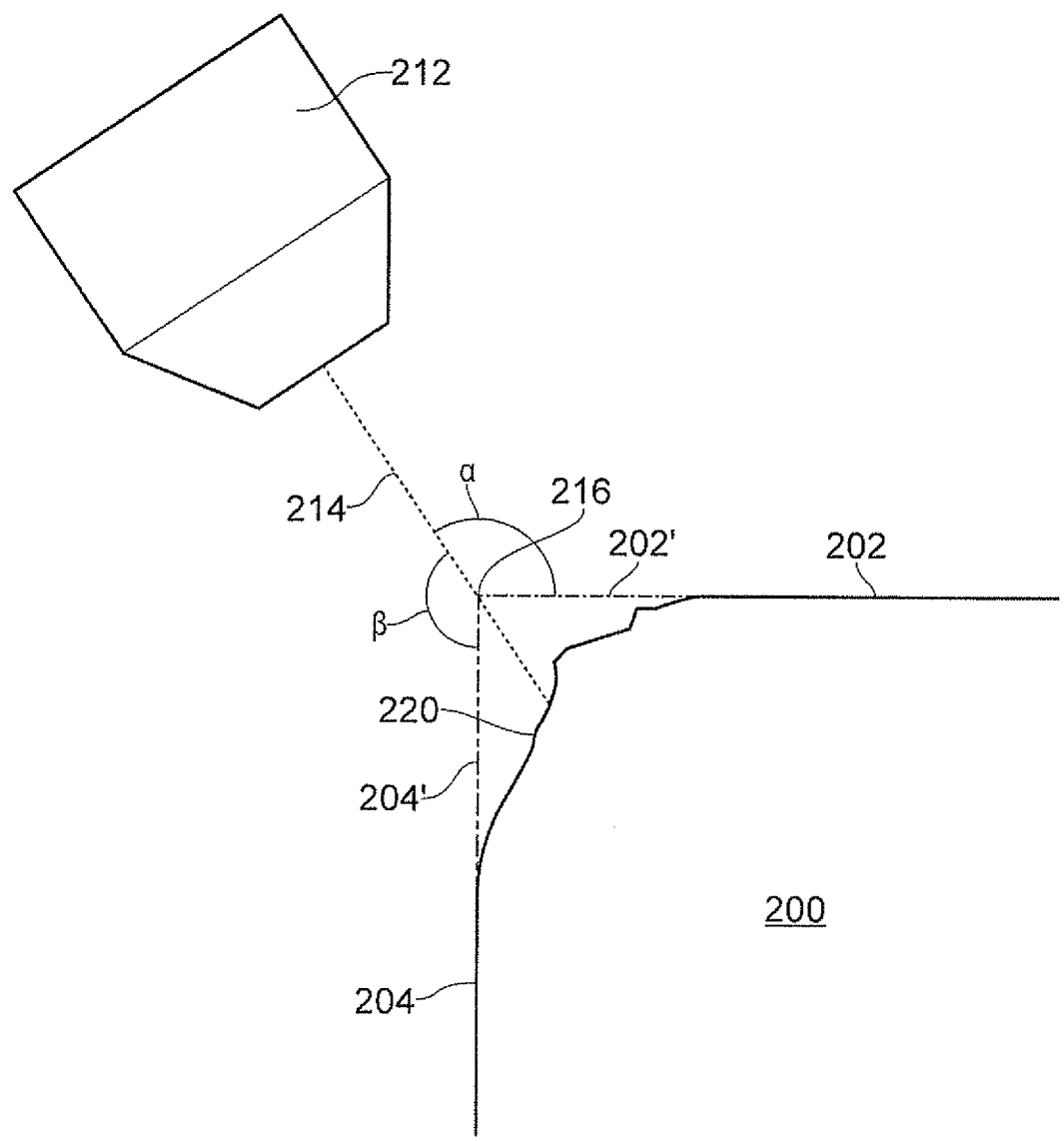
FIG. 5 presents a configuration in which the surfaces of a component, on which edges of a structure is to be built, meet at a curved intersection.

In the example shown in FIG. 5, tip surface 202 and side surface 204 of a component 200 are shown. Unlike the previous examples, the surfaces 202, 204 intersect at a region 220 which is uneven. This may be because the surface has been damaged or because the preceding manufacturing process has resulted in such a geometry. The geometry of the surfaces 202,204 is acquired by a suitable scanning technique. A virtual intersection region 216 is generated by applying curve fitting routines to the scanned undamaged or "desired" surface geometry (for example the surfaces 202, 204) to generate virtual surfaces 202', 204', which are continuations of surfaces 202,204 respectively, and identifying where the virtual surfaces 202', 204' meet.

Material deposited to create a wall at the intersection 216 is deposited on the surface region 220. An obtuse angle α is maintained between a laser 214 and the virtual tip surface 202', and an obtuse angle β is maintained between the laser 214 and the virtual side surface 204'. Hence an obtuse angle α is maintained between the laser 214 and the tip surface 202, and an obtuse angle β is maintained between the laser 214 and the side surface 204.

Figure 6:
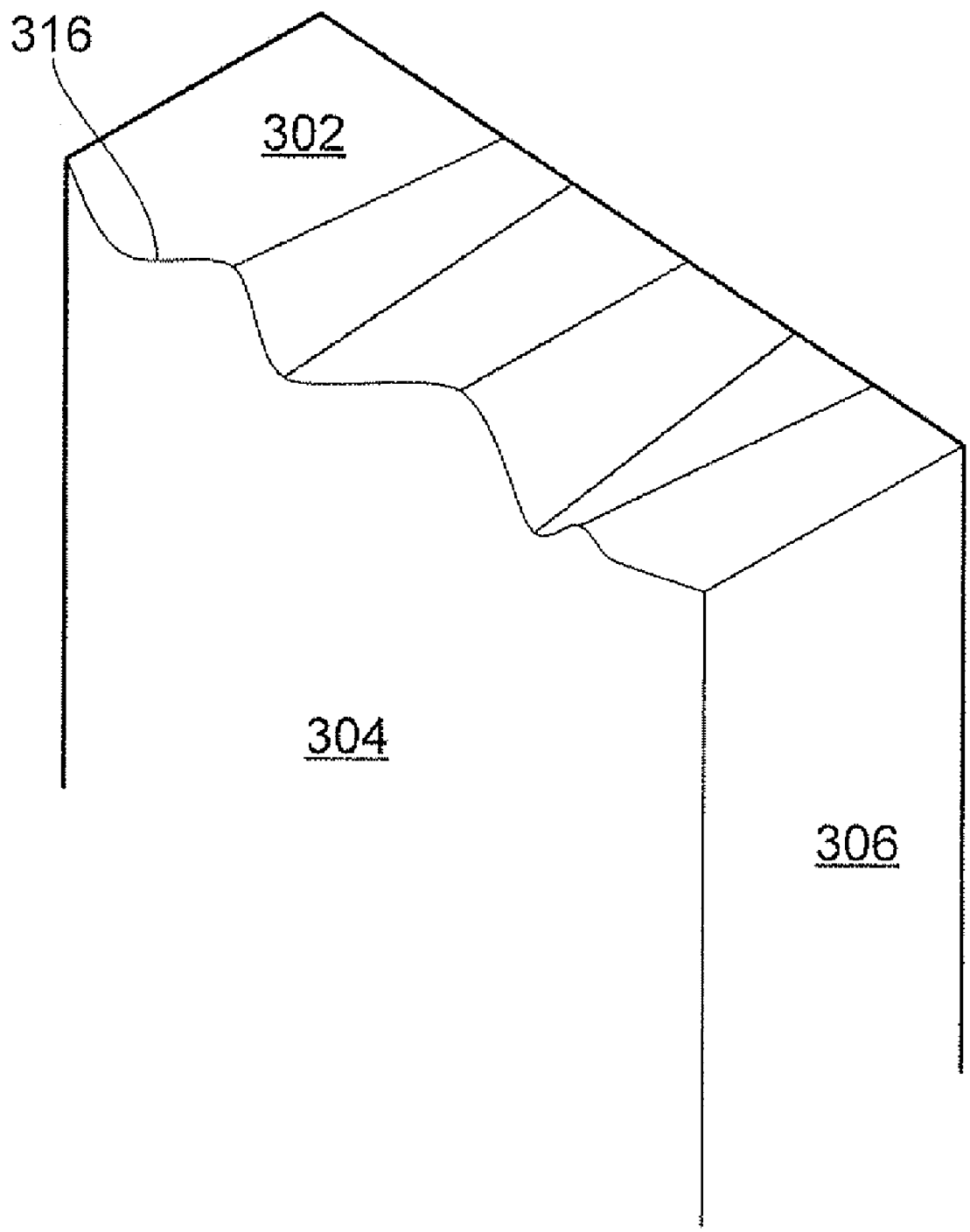
FIG. 6 shows a configuration in which the angle of intersection between the surfaces of the component varies.

In the examples of FIGS. 2, 3, 4 and 5 the surfaces of the component are shown to be at constant angles relative to one another. However, as shown in FIG. 6, the equivalent surfaces vary along the length of the intersection region 316. Consequently the angles β and β will vary as the laser moves relative to the intersection 316.

The angles α, β may have a value of no less than 95 degrees and no greater than 140 degrees to both the surfaces comprising the intersection 116. In a further example one of the angles α, β is no less than 105 degrees and no greater than 115 degrees. As shown in FIG. 2, the angle of the laser beam 114 may be varied at different locations, but will always be maintained between an advantageous range of angles.

In one embodiment of the invention, however, the angles α, β each have a fixed value of substantially 135 degrees.

In a further embodiment the angles α, β are equal to one another, and are equal to half the angle between the intersecting surfaces. Thus, by way of non limiting example, if the intersecting surfaces are at right angles to one another (i.e. the reflex angle between them is 270 degrees), then α=β=135 degrees. By way of further non limiting example, if the intersecting surfaces are at 30 degrees to one another (ie the reflex angle between them is 330 degrees), then α=β=165 degrees.

The powder material delivery system may move with the laser 112, or may move independently of the laser 112. The material ejected from the nozzle of the powder material delivery system has a trajectory which is a function of its ejection speed and the angle of ejection. The powdered material will also be subject to gravity. Hence while it is beneficial to angle the laser 112 in the first deposition process of the present invention, similarly angling the nozzle of the powder material delivery system may result in powdered material being misdirected. For example, powder is preferably delivered at an angle to the vertical, and directed generally downwards to provide a substantially straight powder stream. As the powder jet is moved from the vertical towards the horizontal, the trajectory of the jet is bent into an arc. Hence if the powder delivery system is angled with the source of beamed energy, the distortion of the trajectory of the powder will have to be allowed for to ensure powdered material meets the working area of the beam 114.

The relative orientation of the energy beam 114 and component 100 is adjusted to maintain a constant distance between laser 112 (i.e. the source of the energy beam 114) and the component 100. Thus as the laser 112 is moved around the circumference of the component, regardless of the geometry or profile of the component 100, which may have a complex curved shape, the energy density in the working area of the beam is maintained as substantially constant.

The position where the energy beam 114 meets the intersection 116 is controlled to within less than a 1/100th of the diameter of the energy beam 114.

The working area of the laser beam 114 will fall on both sides of the edge which defines the intersection region 116, such that substantially all of the beamed energy will fall on the component 100 and material being deposited on the component 100. That is to say, substantially none of the beamed energy will directed to anywhere other than the intersection region during this first deposition process. The energy split of the working area of the laser beam 114 between the at least two surfaces comprising the intersection may be approximately equal. In another embodiment at least 60% more energy is directed towards one surface than to the at least one other surface.

Subsequent to the first deposition process, and as shown in FIG. 3, material may be deposited in a second deposition process on tip surface 102. For the second deposition process the energy beam and powdered material delivery system are used as in a conventional weld deposition process, with the energy beam 114 being perpendicular to the surface 102. However, the laser may also be angled to the surface 102 in order to build up lines of deposited material with a particular non symmetrical profile. Where a wall is deposited around an entire circumference of an intersection by the first deposition process, the region enclosed (or defined) by the wall may be substantially completely filled by the second deposition process.

Although the invention may be applied to any situation where deposition is required to build a structure on a substrate, the method is particularly beneficial in the field of manufacture and repair of rotor blades in turbo machinery, the material deposition being deposited at a the tip of the rotor blade. The present invention may be applied to gas turbine engines, where the substrate component is an aerofoil for a gas turbine, the material deposition being deposited at a the tip or edge of the aerofoil or vane.

The invention claimed is:

1. A method for depositing material at an intersection region of at least two surfaces of a component, the method comprising:
   a first deposition process including depositing material at said intersection and directing an energy beam toward the intersection region to join the material to the component, the energy beam being maintained at an obtuse angle relative to at least two of the surfaces such that substantially all of a working area of the energy beam is incident upon the intersection region during the first deposition process; and
   a second deposition process in which further material is deposited on at least one of the surfaces, the energy beam being substantially perpendicular to the surface on the material being deposited in the second deposition process.

2. The method as claimed in claim 1, wherein the component and energy beam are moved relative to one another such that a layer of material is joined with the component along at least part of a length of the intersection.

3. The method as claimed in claim 2, wherein successive layers of material are joined with the component to form a wall along at least part of the length of the intersection.

4. The method as claimed in claim 1, wherein the relative orientation of the energy beam and the component is adjusted to maintain a constant distance between a source of the energy beam and the component.

5. The method as claimed in claim 1, wherein the position where the energy beam meets the intersection is controlled to within less than a $1/100^{th}$ of a diameter of the energy beam.

6. The method as claimed in claim 1, wherein the energy beam is maintained at an angle of no less than 95 degrees and no greater than 140 degrees.

7. The method as claimed in claim 6, wherein the energy beam is maintained at an angle of substantially 135 degrees.

8. The method as claimed in claim 6, wherein the energy beam is maintained at an angle of no less than 105 degrees and no greater than 115 degrees to one of the at least two surfaces.

9. The method as claimed in claim 1, wherein the angle between the energy beam and at least one of the surfaces is substantially equal to half a reflex angle between two of the surfaces.

10. The method as claimed in claim 9, wherein the angle between the energy beam and the at least two surfaces is substantially equal.

11. The method as claimed in claim 1, wherein the energy split between the at least two surfaces is approximately equal.

12. The method as claimed in claim 1, wherein at least 60% more energy is directed towards one surface than to the at least one other surface.

13. The method as claimed in claim 1, wherein a wall is deposited around an entire circumference of an intersection by the first deposition process which is substantially completely filled by the second deposition process.

14. The method as claimed in claim 1, wherein the energy beam is a laser.

15. The method as claimed in claim 1, wherein the component is an aerofoil for a gas turbine; the material deposition being deposited at a tip of the aerofoil.

\* \* \* \* \*